(12) United States Patent
Loh et al.

(10) Patent No.: US 7,430,083 B2
(45) Date of Patent: Sep. 30, 2008

(54) VIRTUAL HEAD FLY PROFILE MEASUREMENT

(75) Inventors: David Loh, Singapore (SG); SanYuan Liew, Singapore (SG); Myint Ngwe, Singapore (SG); FongKheon Chong, Singapore (SG); EngHock Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 827 days.

(21) Appl. No.: 10/405,873

(22) Filed: Apr. 2, 2003

(65) Prior Publication Data

US 2003/0218815 A1 Nov. 27, 2003

Related U.S. Application Data

(60) Provisional application No. 60/383,051, filed on May 23, 2002.

(51) Int. Cl.
G11B 27/36 (2006.01)
G11B 21/02 (2006.01)

(52) U.S. Cl. .......................................... 360/31; 360/75
(58) Field of Classification Search .................. 360/46, 360/75, 31, 53, 51
See application file for complete search history.

(56) References Cited

U.S. PATENT DOCUMENTS

| | | | |
|---|---|---|---|
| 4,146,911 A | 3/1979 | Gyi et al. | |
| 4,777,544 A | 10/1988 | Brown et al. | |
| 4,841,389 A | 6/1989 | Hoyt et al. | |
| 4,872,071 A * | 10/1989 | Easton et al. | 360/31 |
| 5,130,866 A | 7/1992 | Klaassen et al. | |
| 5,166,837 A * | 11/1992 | Nakamura | 360/46 |
| 5,168,413 A | 12/1992 | Coker et al. | |
| 5,410,439 A * | 4/1995 | Egbert et al. | 360/75 |
| 5,831,781 A | 11/1998 | Okamura | |
| 6,097,559 A * | 8/2000 | Ottesen et al. | 360/31 |
| 6,266,199 B1 * | 7/2001 | Gillis et al. | 360/31 |
| 6,282,038 B1 * | 8/2001 | Bonaccio et al. | 360/46 |
| 6,388,413 B1 * | 5/2002 | Ng et al. | 360/75 |
| 6,411,458 B1 * | 6/2002 | Billings et al. | 360/75 |
| 6,437,930 B1 * | 8/2002 | Liu et al. | 360/75 |
| 6,473,259 B1 | 10/2002 | Kuo et al. | |
| 6,501,611 B1 * | 12/2002 | Li | 360/53 |
| 6,529,342 B1 | 3/2003 | Feng et al. | |
| 6,865,040 B2 * | 3/2005 | Fayeulle et al. | 360/75 |
| 7,298,572 B2 * | 11/2007 | Forehand | 360/75 |
| 2001/0013985 A1 * | 8/2001 | Baba et al. | 360/60 |
| 2004/0032681 A1 * | 2/2004 | Smith et al. | 360/75 |
| 2004/0136105 A1 * | 7/2004 | Ma et al. | 360/53 |

* cited by examiner

*Primary Examiner*—Andrea Wellington
*Assistant Examiner*—Dan I Davidson
(74) *Attorney, Agent, or Firm*—Shumaker & Sieffert, P.A.

(57) ABSTRACT

A method for monitoring a data storage medium is provided in which a virtual head fly profile is measured. In addition, a data storage device for implementing the monitoring method is provided.

25 Claims, 6 Drawing Sheets

VIRTUAL HEAD FLY PROFILE MEASUREMENT

CROSS-REFERENCE TO RELATED APPLICATIONS

This application claims the benefit of U.S. Provisional Application No. 60/383,051, filed May 23, 2002.

FIELD OF THE INVENTION

The present invention relates generally to the field of data storage devices and, more particularly, to a method of screening for abnormal head fly profiles in a data storage device.

BACKGROUND

Typically, a data storage device such as a magnetic disc drive, an optical storage device, and a removable disc drive, among others, contains a medium or data storage surface on which data is stored by writing to the media using a transducer, or head. Similarly, data is retrieved from the media by using the head in a read mode. The transducer is normally positioned a specific distance from the media, commonly referred to as a head-disc gap. A spindle motor and a voice coil motor are able to change the relative position of the head and media by a positioning control means. A read/write channel allows communication between the head, positioning control means, and a controller. The controller's main functions are to receive and interpret commands from an outside source, usually an interface adapter on a computer system bus, and transmit control signals to the read/write channel and positioning control means.

A data storage surface, as used in a typical hard disc drive, is commonly divided into multiple data zones oriented in the radial direction. Each data zone typically comprises a set of tracks. Typically, data is stored on the tracks in sectors. Tracks in the outer data zones are longer than those in the inner data zones, thus the tracks in the outer data zones are able to store more data than the tracks in the inner data zones. In this configuration, the additional capacity in the outer data zones is utilized by having a larger number of sectors on each track in the outer data zones. This results in the number of data sectors per track varying from zone to zone.

With the use of hard disc drives, the concept of "flying" heads is generally adopted and can be similarly applied to other data storage devices having similar reading and writing mechanisms. The flying effect of a head is usually achieved by the special design of the air-bearing surface on the head structure that generates elevation whenever there is a difference in air pressure on the head caused by the spinning of the data storage surface. As the rotational speed of the data storage surface increases, so does the head-disc gap created by this phenomenon. At the point when the target rotational speed is reached, a controlled head-disc gap is created that enables the head to glide across the data storage surface effortlessly without actual contact with the data storage surface.

Any head that is flying too low to the data storage surface will incur at least two major risks. First, probability of flight disturbances will be high due to the presence of uneven micro-bumps on the data storage surface. This will often cause "skipped writes" and other read/write abnormalities. A skipped write is an abnormal write event where the writer/head experiences a sudden lift away from the disc surface. This is normally caused by a disturbance in the air flow or particle contact. This event is thought to be caused at times by the inherent lack of spacing between head and the disc where the probability of air disturbance or particle contact is higher. The final result of such an event is a badly written region which leads to user errors. Second, there is a higher risk of head to surface contact. This can result in smearing, scratching, or even a head crash.

All of these effects are often aggravated by changes in the device temperature. Any temperature increase will cause a corresponding change in air pressure, which may affect the head-disc gap and in turn will cause the head to fly lower. Any such effects are undesirable and may cause long-term reliability issues.

Historically, previous methods have measured head-disc gap by a number of different techniques. The previous methods have also tried to estimate the short-term effect of flight disturbances on the data storage device's operation.

However, there are problems with the previous methods. The previous methods do not predict long-term drive failure. Also, many of the previous methods require the addition of special hardware to the data storage device, thus increasing the cost and complexity of the device. Typically, the previous methods used servo data to perform calculations. This method can not be used to predict long term device reliability issues because servo data is usually recorded at a lower recording frequency than user data. This is due to the fact that the analysis of data recorded at a lower frequency results in less sensitive and accurate measurement of critical effects on a data storage device. Furthermore, the effect of flight disturbances on user data is ultimately what is important to the user, not the effect on servo data.

Even further, the previous methods do not effectively predict data storage device failure due to individual problem areas, collectively problematic regions of the data storage surface, problematic heads, or data storage surfaces in general. Also, the previous methods neglect the effect of varying data density on recording signal strength. Increased data density improves the storage capacity of the device, but can result in data interfering with neighboring data. This phenomenon is known in the art as Inter-Symbol Interference (ISI). Along with head-disc spacing, inter-symbol interference can also affect signal strength. Thus, fly-height abnormalities at an area of higher data density on the data storage surface will have a greater effect on signal strength than fly-height abnormalities at an area of lower data density.

The present invention provides a solution to these and other problems, and offers other advantages over the prior art.

SUMMARY OF THE INVENTION

The present invention relates to data storage devices with concentric tracks of data which solve the above-mentioned problems.

In accordance with one embodiment of the invention, a method for monitoring a data storage medium having concentric data storage tracks is provided including writing test data at a constant frequency on a first diameter and at a second diameter of a data zone; reading the test data at the first diameter to produce a first read signal and at the second diameter to produce a second read signal; comparing the first read signal with the second read signal; and determining if there is a fly-height abnormality from the comparing. In addition, the invention also can be implemented as a data storage device itself.

These and various other features as well as advantages which characterize the present invention will be apparent upon reading of the following detailed description and review of the associated drawings.

DETAILED DESCRIPTION

Figure 1:
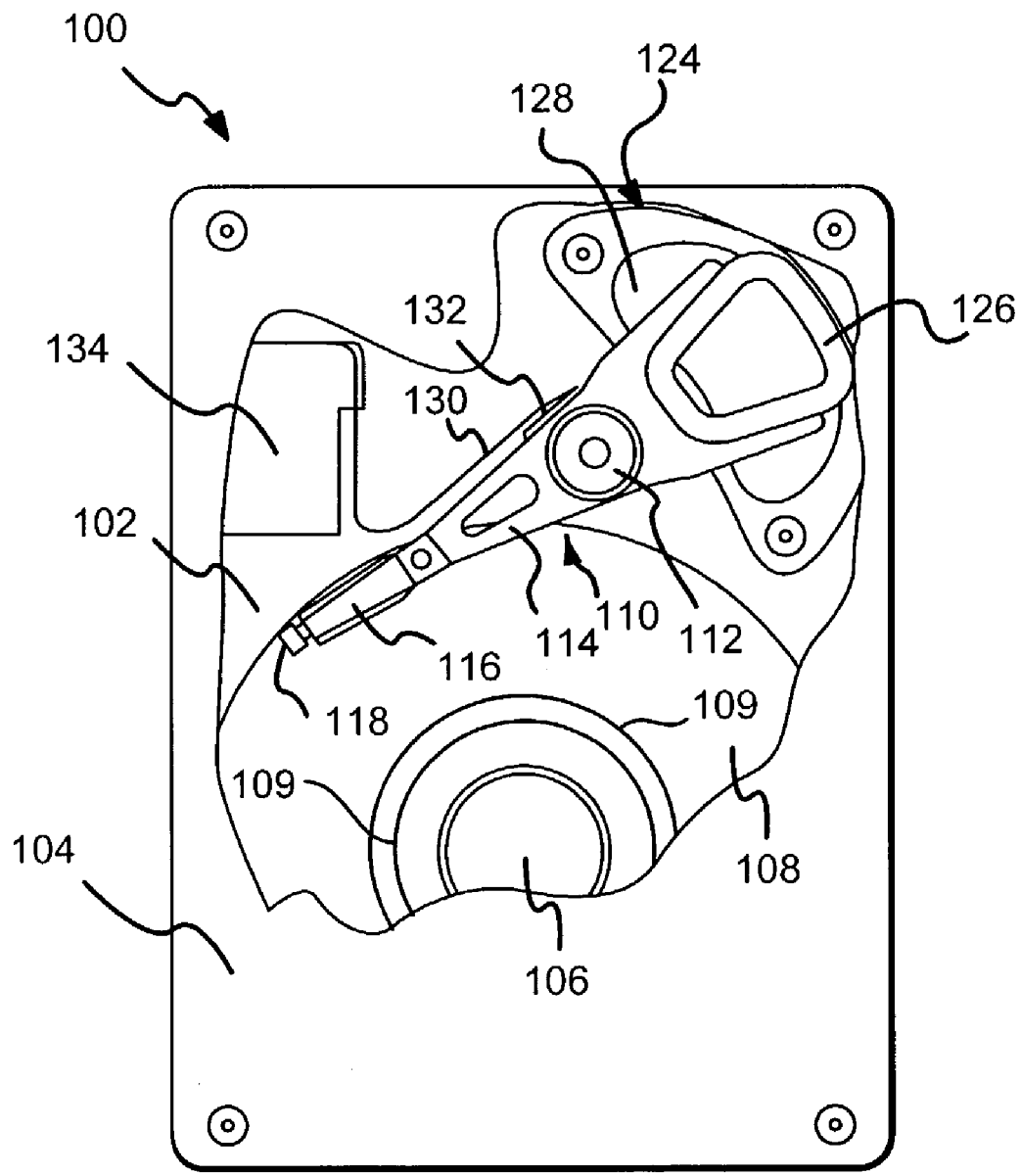
FIG. 1 is a top plan view of a disc drive incorporating the preferred embodiment of the present invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a read/write head 118 which includes an air bearing slider (not shown) enabling the head 118 to fly in close proximity above the corresponding surface of the associated disc 108.

During a seek operation, the position of the read/write heads 118 over the discs 108 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

As shown in FIG. 1, located on the surface of the discs 108 are a plurality of nominally circular, concentric tracks 109. Each track 109 preferably includes a number of servo fields that are periodically interspersed with user data fields along the track 109. The user data fields are used to store user data and the servo fields used to store servo information used by a disc drive servo system to control the position of the read/write heads.

Figure 2:
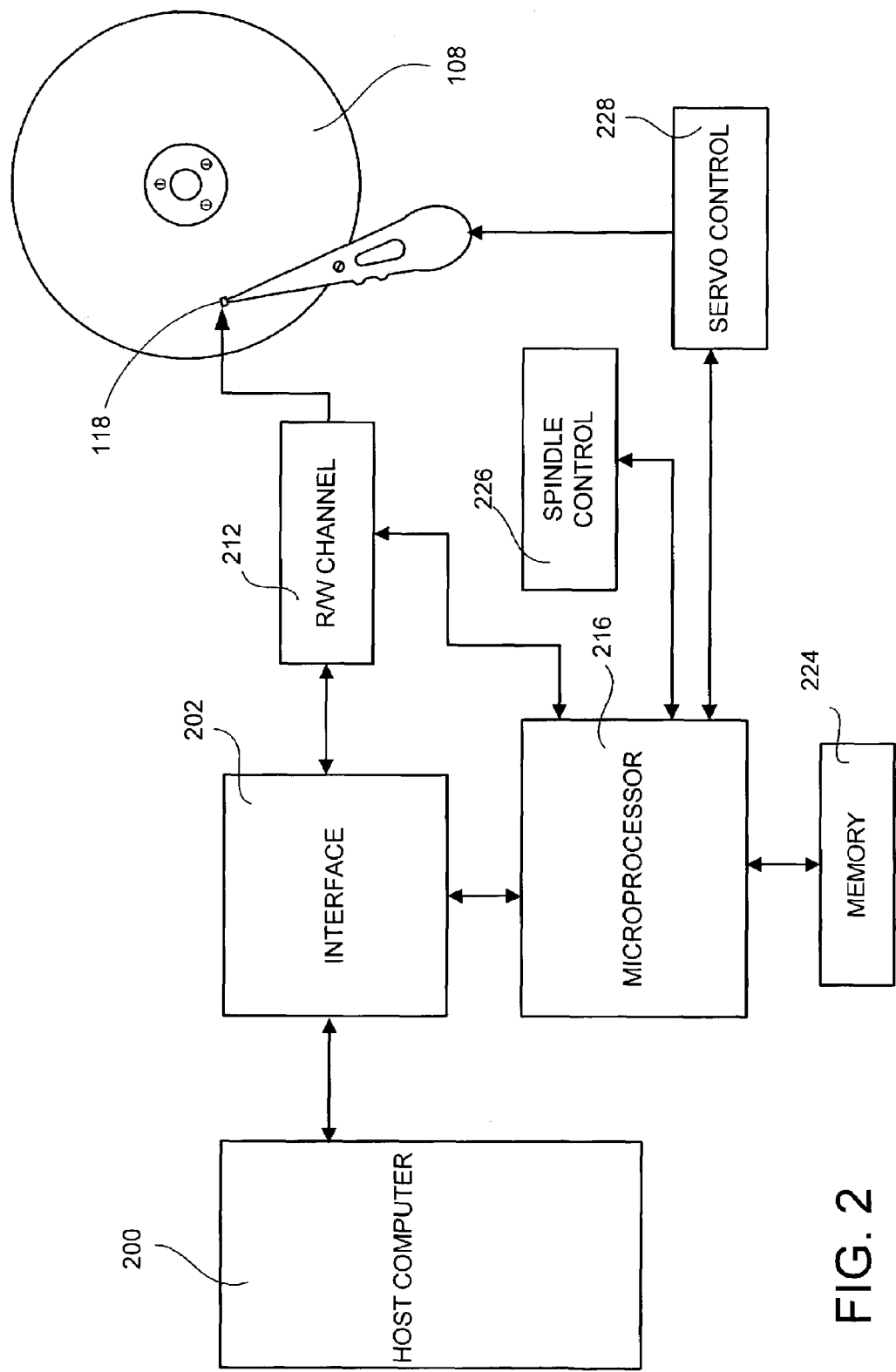
FIG. 2 is a functional block diagram of the disc drive of FIG. 1.

FIG. 2 provides a functional block diagram of the disc drive 100 of FIG. 1, operably connected to a host computer 200. As shown in FIG. 2, the disc drive 100 generally comprises or includes circuits or modules for spindle control 226, servo control 228 and read/write channel control 212, all operably connected to a system microprocessor 216. Additionally, an interface 202 is shown connected to the read/write channel 212 and to the system microprocessor 216, with the interface circuit 202 serving as a conventional data interface and buffer for the disc drive 100. As will be recognized, the spindle control 228 controls the rotational speed of the spindle motor 106.

In operation of the disc drive 100, the servo control 228 receives servo position information from the tracks 109 via the read/write heads 118 and, in response thereto, provides a correction signal to the actuator coil 126 in order to position the heads 118 with respect to the discs 108. The read/write channel 212 operates to write data to the tracks 109 in response to user data provided to the channel from the interface 202 by encoding and serializing the data and generating a write current utilized by the heads 118 to selectively magnetize portions of a selected track 109 on the discs 108. Correspondingly, data previously stored on a track 109 are retrieved by the read/write channel 212 by reconstructing the data from the read signals generated by a head 118 as the head passes over the selected track 109 on the disc 108. The operation of the read/write channel 212 in accordance with the preferred embodiment of the present invention will be discussed in greater detail below.

It will be noted that the various operations of the disc drive 100 may be controlled by the microprocessor 216, in accordance with programming stored in system microprocessor memory 224. Those skilled in the art will recognize that typical disc drives include additional circuitry and functions beyond those delineated above, but such are only of general interest to the present discussion and accordingly do not warrant further description.

Figure 3:
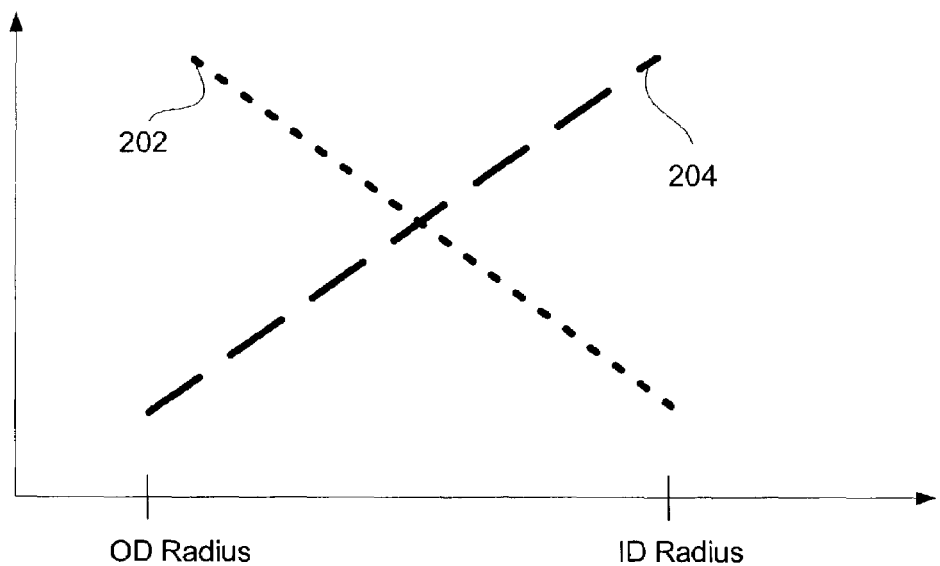
FIG. 3 shows theoretical signal amplitude response to the increase in area density.

As shown in FIG. 3 when data is written at a constant frequency, theoretical signal amplitude 202 varies in a linear fashion to the radius measured from an outer diameter (OD) to an inner diameter (ID). Area density 204 (KBPI) in this case varies in a linear, inversely proportional manner to the radius measured from the OD to the ID. This is due to the effect of increasing Inter-Symbol Interference (ISI) as the area density increases.

Figure 4:
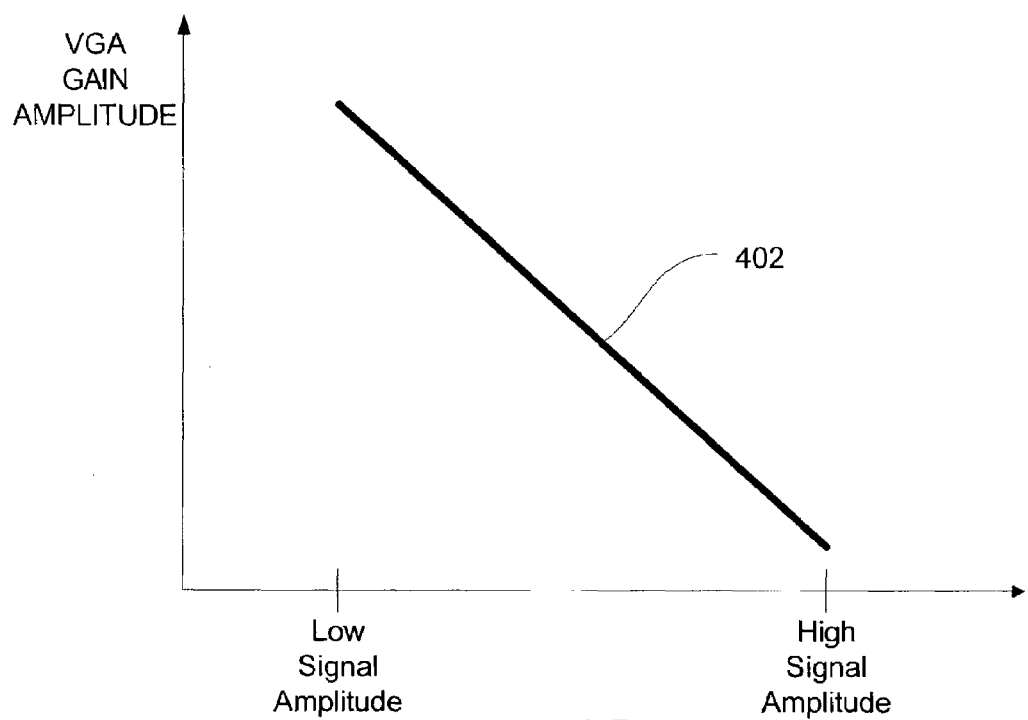
FIG. 4 shows theoretical adaptive gain response to increasing signal amplitude.

FIG. 4 shows that the theoretical adaptive Variable Gain Amplifier (VGA) gain response 402 is inversely proportional to increasing the signal amplitude.

Figure 5:
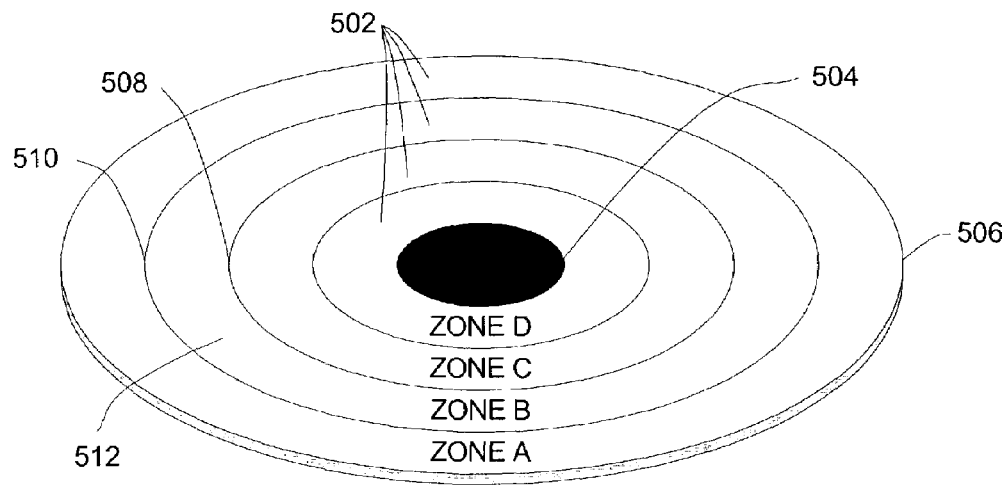
FIG. 5 shows a simplified example of a data surface with data zoning.

FIG. 5 is an illustrative example of data zoning on a disc. Zoning is done to help compensate for large differences in area density between the disc inner diameter (ID) track 504 and the disc outer diameter (OD) track 506. This example contains four zones A, B, C, and D 502, each zone preferably written at a constant frequency. Each of the zones also has an inner diameter track 508 and an outer diameter track 510, as shown for Zone B 512 in FIG. 4. Because area density increases toward the ID, as shown in FIG. 3, the frequencies in the zones 502 follow this relationship:

Freq. Of Zone A>Freq. Of Zone B.>Freq. Of Zone C>Freq. Of Zone D

Figure 6:
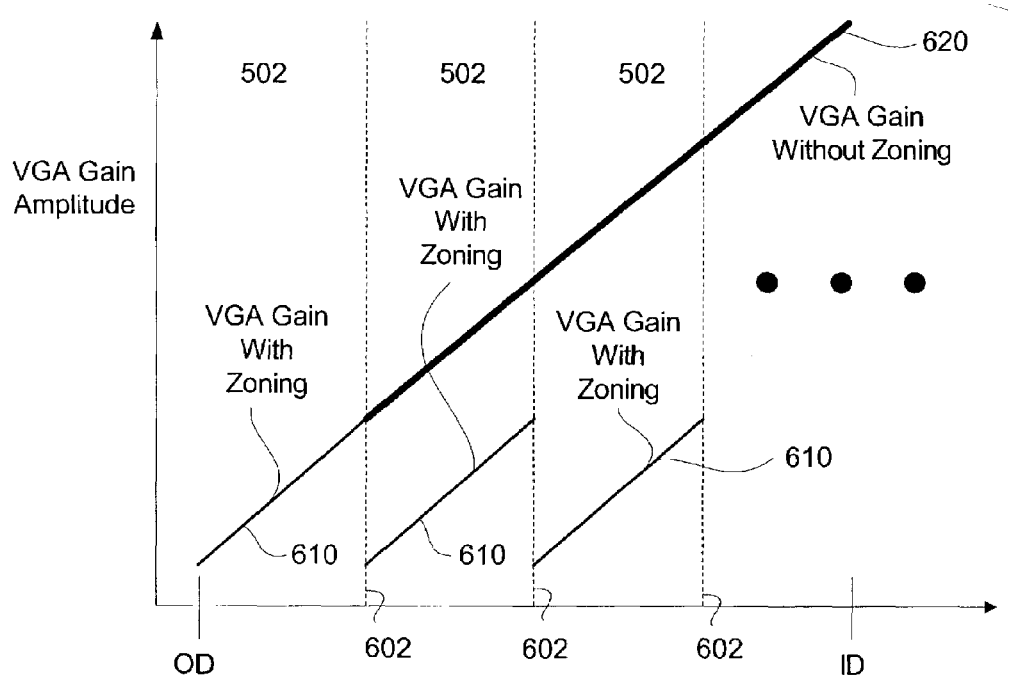
FIG. 6 shows adapted VGA gain response with and without zoning.

FIG. 6 illustrates VGA values with zoning 610 and without zoning 620. As can be seen in FIG. 6, when the head 118 goes into a new zone 506 (crosses over the boundary 602), there is an expected VGA gain drop due to the reduction of frequency. This can be seen when the head crosses over a zone boundary 602. This change is due to the change in frequency from one zone 502 to the other, as the head moves from the OD to the ID.

Figure 7:
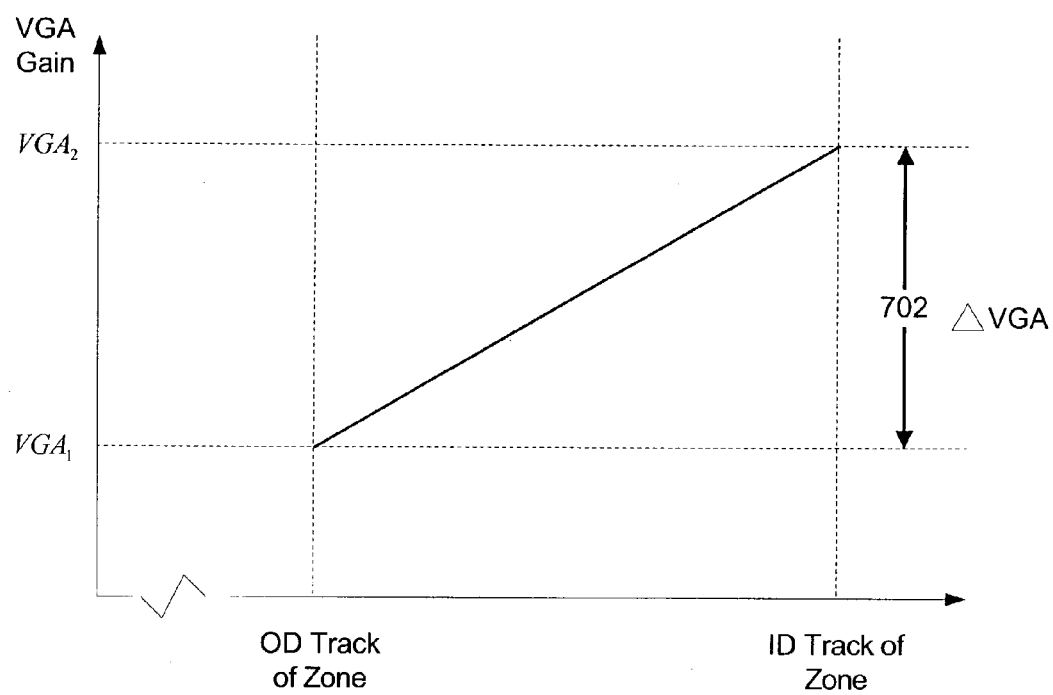
FIG. 7 shows adapted VGA gain response within a zone.

Within a zone 502, the effect as seen in FIG. 3 can still be felt, though the difference in signal amplitude 202 is smaller. This is dependent on the size and number of zones 502 used. FIG. 7 illustrates this difference, called ΔVGA 702. Ideally, ΔVGA 702 is a negative value approximately around an optimum number ($\Delta VGA_{OPT}$). For example, if ΔVGA in a certain zone is well above $\Delta VGA_{OPT}$, it is highly likely the increase in signal amplitude 202 is due to a low head flight profile. This may indicate long-term reliability issues. Preferably, the method to measure this amount of amplitude change is to use an adaptive gain read-out of a channel amplifier (not shown) located in the read/write channel 212.

Figure 8:
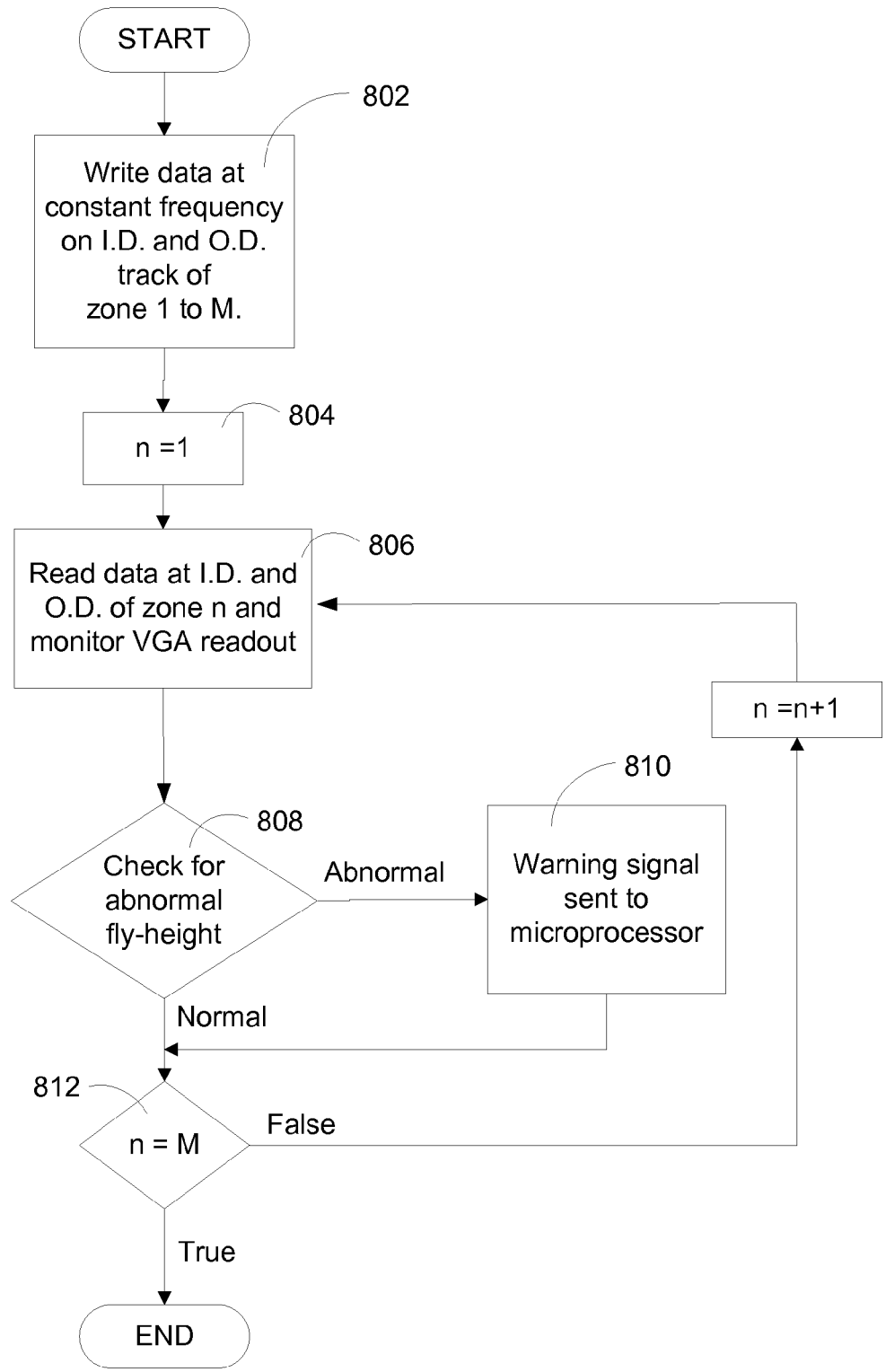
FIG. 8 shows a flowchart for determining a virtual head fly profile.

FIG. 8 illustrates a process of screening for abnormal heads representative of the preferred embodiment. The process takes place either during manufacture or on-the-fly in a hard disc drive having a disc surface 108. The disc surface contains M zones 502, where M is a positive whole number. First, a constant frequency (single tone 2T) pattern is written 802 on the inner diameter 508 and the outer diameter 510 of each zone 502. Starting at the first zone 804, the ID track and the OD track of the zone is read 806 and ΔVGA is computed for the zone 506 by the following equation:

$$\Delta VGA = VGA_{OD} - VGA_{ID} \quad (1)$$

This is preferably done for each zone 502.

Once ΔVGA is obtained for at least one zone, it can be used to screen for abnormal flying heads 808. One advantage of screening for abnormal flying heads is to improve disc drive reliability. Three methods are proposed for screening abnormal flying heads.

The first screening method tests for whether the head is flying lower at the inner diameter (i.e. 508) of the zone than at the outer diameter (i.e. 510) of the zone. This can be accomplished by defining a threshold level Y1 and then comparing Y1 to ΔVGA. If ΔVGA is greater than or equal to Y1 a warning signal is sent 810 to the microprocessor 216 to indicate a test failure because this should only happen when the head is flying lower at the inner diameter than at the outer diameter. This test condition may be represented as shown below:

$$\Delta VGA(n) \geq Y1 \quad (2)$$

This test condition usually indicates the head is flying lower at the inner diameter of the zone than at the outer diameter. If this condition is present, the drive may be able to read or write successfully in this zone, but this abnormal flight can compromise reliability for the medium or long term life of the drive.

A second screening method screens out heads that have a positive ΔVGA for more than one zone 502. For the second method, ΔVGA is calculated from the zone containing the disc outer diameter 506 thru the current zone, n. This may be represented by the following equation:

$$A(n) = \sum_{i=1}^{n} \Delta VGA(i) \geq Y2 \quad (3)$$

If this A(n) is greater than a predetermined value Y2, there may be a consistent problem over the majority of the disc surface and a warning signal 810 is sent to the microprocessor 216. Typically, this screening method will screen out a low-flying head with many consecutive zones that are slightly problematic but are within the specifications tested by the first screening method.

The third proposed screening method screens head with overall low flying ability. The proposed screening method can be defined as:

$$A(m) \geq Y3 \quad (4)$$

where m represents the number of zones 502 and Y3 is a predetermined value. This method will screen out heads with overall low flying ability and send a warning signal to the microprocessor 216 if the above equation 4 is true. Screening for overall low flying ability tries to detect if the head is flying generally low across the entire disc, or a substantial portion of the disc. In this situation, there is usually no sudden loss of fly-height at a specific radius. An overall low flying ability could be caused by an inherent error in the gram-loading of the suspension or an abnormally dimensioned head.

In the preferred embodiment, all three conditions are iteratively checked until all of the zones 502 have been considered 812.

It should be noted additional possibilities exist regarding where data is written and read from to perform calculations. Any portion of the disc surface that can be read or written can be utilized in the process of determining flight abnormalities.

It should also be noted the above conditions used to determine failure can be altered or substituted for any other method producing substantially the same information.

From the preferred embodiment above a number of advantages can be identified, including predicting problems related to short, medium, and long-term reliability. The above methods can be used to find flight abnormalities due to bad heads, discs, or both. Also, the above process can be applied in any combination to individual head testing, disc testing, drive testing, in manufacturing or can be used during the normal use of the drive to help warn or prevent failures over the lifespan of the drive. The above process can also find flight problems due to the head, disc, or both over a specific track on the disc, region of the disc surface, or the entire disc surface. Groups of tracks with individual, less severe problems can be considered problematic when looked at collectively.

The above methods provide excellent results because the above calculations can be done over the user data portions on the disc, rather than over the servo portions of the disc. Although it is possible to perform the above calculations using the servo portions on the disc; ultimately, the user data is what is important to the user of the disc drive. Further, calculations done using servo data may not be indicative of drive performance as far as the user is concerned. Furthermore, servo data is normally written at a lower frequency resulting in less sensitive measurements. Calculations over the data portions allow for more accurate measurement and better predictions of reliability and performance.

Additionally, the above calculations utilize knowledge of Inter-Symbol Interference by recognizing that flight abnormalities that occur further toward the inner diameter of a zone will have a greater effect on drive performance and are accounted for accordingly.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A method comprising:
   comparing a first read signal read at an inner diameter track of a data zone with a second read signal read at an outer diameter track of the data zone, wherein the data zone is one of a plurality of data zones, and wherein each one of the plurality of data zones is read at a different, substantially constant frequency; and
   determining whether there is a fly-height abnormality in the data zone based on the comparison.

2. The method of claim 1 wherein the inner diameter track of the data zone and the outer diameter track of the data zone are within a user data portion of a data storage medium, and wherein data read from the inner diameter track and outer diameter track is user data.

3. The method of claim 1 wherein the comparison further comprises:
   determining a difference between a first output signal that is relative to an amplitude of the first read signal and a second output signal that is relative to an amplitude of the second read signal;
   comparing the difference to a threshold level; and
   determining presence of a fly-height abnormality when the difference is greater than or equal to the threshold.

4. The method of claim 3 wherein the inner diameter track and the outer diameter track are on different concentric tracks of the data storage medium and wherein the inner diameter track is located closer to a center of the data storage medium than the outer diameter track.

5. The method of claim 1 wherein the determining an occurrence of a fly-height abnormality identifies a head that is flying lower at the inner diameter track than at the outer diameter track.

6. The method of claim 1 wherein the comparison further comprises finding a difference between the first read signal and the second read signal, according to the following equation:

$$\Delta VGA = VGA_{OD} - VGA_{ID}$$

where $VGA_{OD}$ is a first variable gain amplifier gain associated with an amplitude of the second read signal, and $VGA_{ID}$ is a second variable gain amplifier gain associated with an amplitude of the first read signal.

7. The method of claim 6, wherein the determining further comprises detecting a fly-height abnormality by comparing the difference in amplitudes with a predetermined threshold value.

8. The method of claim 1 wherein the determining an occurrence of a fly-height abnormality identifies a head-slap occurrence.

9. The method of claim 1 wherein the determining an occurrence of a fly-height abnormality identifies a low-flying head in one zone.

10. The method of claim 1, further comprising
    comparing a first read signal read at an inner diameter track of a second data zone with a second read signal read at an outer diameter track of the second data zone, wherein the second data zone is one of the plurality of data zones; and
    determining whether there is a fly-height abnormality in the second data zone based on the comparison of the read signal read at the inner diameter track of the second data zone with the second read signal read at the outer diameter track of the second data zone.

11. The method of claim 10 further comprising:
    determining whether a head is flying low for at least a substantial portion of the data zone and the second data zone based upon both the comparison of the first read signal read at the inner diameter track of the data zone with the second read signal read at the outer diameter track of the data zone and the comparison of the first read signal read at the inner diameter track of the second data zone with the second read signal read at the outer diameter track of the second data zone.

12. The method of claim 1 wherein the determining an occurrence of a fly-height abnormality identifies a problem selected from the group consisting of a head problem, a disc problem, and a track problem.

13. A memory comprising instructions to cause one or more processors to:
    compare a first read signal read at an inner diameter track of a data zone with a second read signal read at an outer diameter track of the data zone, wherein the data zone is one of a plurality of data zones, and wherein each one of the plurality of data zones is read at a different, substantially constant frequency; and
    determine whether there is a fly-height abnormality in the data zone based on the comparison.

14. An apparatus comprising:
    a head that reads a first read signal from an inner data track and a second read signal from an outer data track in a data zone of a data storage medium, wherein the data zone is one of a plurality of data zones, and wherein the head reads each one of the plurality of data zones at a different, substantially constant frequency; and
    a controller that compares the first read signal to the second read signal of the data zone to detect a fly-height abnormality.

15. The apparatus of claim 14 wherein the inner data track and the outer data track are within a user data portion of the data storage medium, and wherein data read from the inner data track and outer data track is user data.

16. The apparatus of claim 14 wherein the controller further
    determines a difference between a first output signal that is relative to an amplitude of the first read signal and a second output signal that is relative to an amplitude of the second read signal;
    compares the difference to a threshold level; and
    determines presence of a fly-height abnormality when the difference is greater than or equal to the threshold.

17. The apparatus of claim 16 wherein the inner data track is located closer to the center of the data storage medium than the outer data track.

18. The apparatus of claim 14 wherein the controller further calculates a first value that represents a difference between an amplitude of the second read signal and an amplitude of the first read signal, according to the following equation:

$$\Delta VGA = VGA_{OD} - VGA_{ID}$$

where $VGA_{OD}$ is a first variable gain amplifier gain associated with the amplitude of the second read signal,
$VGA_{ID}$ is a second variable gain amplifier gain associated with the amplitude of the first read signal.

19. The apparatus of claim 18, wherein the controller further compares the first calculated value to a predetermined threshold value to detect the fly-height abnormality.

20. The apparatus of claim 14 wherein the fly-height abnormality further comprises a head-slap occurrence.

21. The apparatus of claim 14 wherein the fly-height abnormality further comprises a low-flying head in one zone.

22. The apparatus of claim 14, wherein the head further reads a first read signal from an inner track of a second data zone and a second read signal from an outer diameter track of the second data zone, wherein the second data zone is one of the plurality of data zones, and the controller further compares the first read signal of the second data zone to the second read signal of the second data zone to detect a fly-height abnormality in the second data zone.

23. The apparatus of claim 22 wherein the controller further determines whether the head is flying low for at least a substantial portion of the data zone and the second data zone based upon both the comparison of the first read signal read at the inner diameter track of the data zone with the second read signal read at the outer diameter track of the data zone and the comparison of the first read signal read at the inner diameter track of the second data zone with the second read signal read at the outer diameter track of the second data zone.

24. The apparatus of claim 14, wherein the fly-height abnormality indicates that the head flying lower at the inner diameter than at the outer diameter.

25. The apparatus of claim 14 wherein the fly-height abnormality further comprises a problem selected from the group consisting of a head problem, a disc problem, and a track problem.

* * * * *